United States Patent

Knapp et al.

Patent Number: 5,947,862
Date of Patent: Sep. 7, 1999

[54] DEVICE FOR CONTROLLING THE GEAR RATIO OF A CONTINUOUSLY VARIABLE TRANSMISSION

[75] Inventors: Thomas Knapp, Karlstein; Gerhard Eschrich, Tettnang; Wolfgang Runge, Ravensburg, all of Germany

[73] Assignee: ZF Friedrichshafen AG, D-88038 Friedrichshafen, Germany

[21] Appl. No.: 08/973,886

[22] PCT Filed: Jul. 20, 1996

[86] PCT No.: PCT/EP96/03208

§ 371 Date: Dec. 17, 1997

§ 102(e) Date: Dec. 17, 1997

[87] PCT Pub. No.: WO97/05407

PCT Pub. Date: Feb. 13, 1997

[30] Foreign Application Priority Data

Jul. 27, 1995 [DE] Germany ............... 195 27 412

[51] Int. Cl.⁶ .................................................. B60K 41/14
[52] U.S. Cl. .................................................. 477/46; 477/48
[58] Field of Search ................................. 477/46, 48, 49; 701/60, 61

[56] References Cited

U.S. PATENT DOCUMENTS

| | | | |
|---|---|---|---|
| 4,509,125 | 4/1985 | Fattic et al. | 477/48 X |
| 4,683,779 | 8/1987 | Osanai et al. | 477/46 X |
| 4,811,225 | 3/1989 | Petzold et al. | 477/49 X |
| 4,852,429 | 8/1989 | Künzer et al. | |
| 5,009,129 | 4/1991 | Morimoto et al. | 477/49 |
| 5,782,719 | 7/1998 | Adachi | 477/46 |
| 5,820,514 | 10/1998 | Adachi | 477/46 |
| 5,860,891 | 1/1999 | Bauerle | 477/48 |

FOREIGN PATENT DOCUMENTS

| | | |
|---|---|---|
| 0 260 117 A1 | 3/1988 | European Pat. Off. . |
| 0 281 850 A3 | 9/1988 | European Pat. Off. . |
| 0 364 270 A1 | 4/1990 | European Pat. Off. . |
| 36 36 463 A1 | 5/1988 | Germany . |
| 42 29 585 A1 | 3/1994 | Germany . |

*Primary Examiner*—Charles A Marmor
*Assistant Examiner*—Scott Lund
*Attorney, Agent, or Firm*—Davis and Bujold

[57] ABSTRACT

A device for controlling the gear ratio of a continuously variable transmission. The theoretical rotational speed or transmission ratio is fed to the signal input of a set-value filter (44). The time constant (T_RS) of the set-value filter (44) is adaptively controlled so that the change in transmission ratio takes place in accordance with a transition function whose limit is defined by a maximum variation speed. The principal advantage of the invention is that the vehicle is not slowed when shifting down to lower transmission ratios.

8 Claims, 7 Drawing Sheets

DEVICE FOR CONTROLLING THE GEAR RATIO OF A CONTINUOUSLY VARIABLE TRANSMISSION

BACKGROUND OF THE INVENTION

The invention relates to a device for controlling the gear ratio of a continuously variable transmission in a vehicle having a prime mover and an output governor device. To them are specified, via an accelerator pedal, theoretical rotational speed values of the prime mover. The theoretical rotational speed values are compared with measured actual rotational speed values. The device also has a setting device for changing the gear ratio of the continuously variable transmission. Control signals of a rotational speed governor are fed to it which result from the differences between theoretical and actual rotational speed values of the prime mover.

As a rule, the above mentioned continuously variable transmissions have bevel discs which, between them, enclose a rotary traction means. Axial contact pressures are exerted upon the bevel discs via a hydraulically working setting device.

The position of the throttle valve, or the like, serves as an input parameter for control of a continuously variable transmission via a control part (gas or accelerator pedal). For said input parameter, a theoretical rotational speed value, which is compared with the actual rotational speed value, is preset for the prime mover. Control divergences release the adjustment of the transmission, for example, by a solenoid valve. When the rotational speed is too low, the transmission ratio becomes smaller, when the rotational speed is high, it is adjusted larger. The control loop is closed by a repeated comparison with the actual rotational speed value.

In the operational strategies known already, the point of departure is that by the position of the control part the driver presets a desired performance from which results a desired engine rotational speed nM-theor, optionally under the influence of optimization criteria (mode of driving, driving environment). An optimization criterion can be, for example, the intersection point of a line of minimal fuel consumption with the actual line of the throttle valve position in the engine performance graph. The appertaining transmission ratio of the continuously variable transmission iV-theor. then results as a sequential parameter from the desired engine rotational speed nM-theor. and the actual vehicle speed vF. By using an electronic transmission control, it is possible to select different driving programs (as a rule economical or performance oriented) by a switch which can be situated, for example, on the selector lever.

Depending on which driving program is active, different reaction speeds, according to the parameter of the change in position of the throttle valve or the adjusted speed, are to be expected or taken into consideration.

The inertia moments of the transmission and the engine are essential for the demands on the hydraulic system, kinematics and the time characteristic of the system. This means, among other things, that too quick a shift during a down change leads to braking of the vehicle, since all of the rotating masses of the vehicle inertia must be accelerated and that no increase in speed is to be registered during the shift, since the engine torque is fully used for acceleration of the rotating masses of the transmission of the engine. This fact makes itself disadvantageously noticeable in certain driving conditions. Thus, for example, when the driver expects an instantaneous acceleration during a down change. In order to ensure a continuous speed increase, the adjusting speed, that is, the change of transmission ratio of the continuously variable transmission, must be variable over the time. The timed change of the adjustment is here of basic significance for the quality of the control and thus finally also for the driving comfort obtainable.

DE-A 36 36 463 proposes a method for limiting the variation speed. Such limitation results essentially for reasons of comfort, since torque jumps and undesired vehicle accelerations or decelerations must be avoided. There must also be brought about, as direct as possible, a relation between the position of the control member (accelerator pedal) and the driving impression (improvement of the subjective driving impression, driveability).

EP-A 0 364 270 has disclosed a control system for a continuously variable transmission in which sensors are provided for detecting the rotational speeds of the bevel discs and of the degree of opening of the throttle valve. A theoretical transmission ratio is calculated from the throttle valve opening. The variation gradient, with which the transmission ratio of the continuously variable transmission is produced, is corrected according to the actual driving speed. At low vehicle speeds, the variation is relatively quick while, at high vehicle speeds, the variation gradient (diV/dt) is reduced.

Finally, there has been disclosed in DE-A 42 29 585 a device for control of the gear ratio of a continuously variable transmission in which a stationary theoretical rotation speed value is deduced from an operational performance graph and fed to a set-value filter, at the exit, which transmits an unsteady theoretical rotational speed value. The set-value filter affects the dynamic characteristic. A specific characteristic, of the variation characteristics, is obtained by adequate transmission functions.

The proposals belonging to the prior art all seek to obviate one disadvantage of a continuously variable transmission: in special situations the continuously variable transmission reacts with an uneven acceleration characteristic. The driveability can be objectively made clear by the following characteristic: upon a sudden change in the position of the throttle valve, the theoretical rotational speed value of the prime mover bounces vertically. Contrary to said significant rise in the rotational speed of the engine, the vehicle speed remains constant, at first, for a certain period of time. It is above all disadvantageous that the driver accordingly, at first, does not perceive any acceleration of the vehicle. Under unfavorable circumstances, that is, when the variation gradient has not been adapted to the transmission ratio, in addition, a brief deceleration of the vehicle occurs. Said behavior is not expected by the driver and therefore is felt as unpleasant. To complicate this is added that the driver, who via the accelerator pedal, has announced a need for power but, despite a significant rise of the engine rotational speed, experiences no acceleration of the vehicle, tries to clear this situation by announcing a still greater need for power. The consequence of this is an overcontrol of the throttle valve. In the reaction that sets in, said overcontrol leads to a discharge of the vehicle. It is these disadvantages that are meant when speaking of a so-called "suspenders effect" in connection with continuously variable transmissions.

SUMMARY OF THE INVENTION

The problem to be solved by this invention is to provide a device for control of the gear ratio of a continuously variable transmission which, in certain driving situations, especially during a downshift, preferably ensures an acceleration of the vehicle or at least reliably eliminates a deceleration of the vehicle.

This problem is solved by a device for control of the gear ratio of a continuously variable transmission according to the preamble of the main claim and including the characteristics stated therein.

The invention stands out by the adaptive characteristic of the set-value filter. The time constant of said filter is adapted to the actual condition of the vehicle so that the change of the transmission ratio takes place, according to a transition function, in which the vehicle does not exceed a predetermined minimum acceleration or deceleration. The proposed solution is of special advantage when used in combination with a downshift of the continuously variable transmission. Taking into account the specific driving data of the vehicle and the driving environment, the time constant is preferably adapted so that the vehicle is accelerated during a downshift. At least a time constant is adjusted which prevents a deceleration of the vehicle. The "suspenders effect", known in continuously variable transmissions, is thus completely eliminated.

Other preferred embodiments are object of subclaims 2 to 8.

Other features of the invention, and the advantages resulting therefrom, are to be understood from the description that follows of one embodiment with reference to drawings.

DETAILED DESCRIPTION OF THE INVENTION

Figure 1:
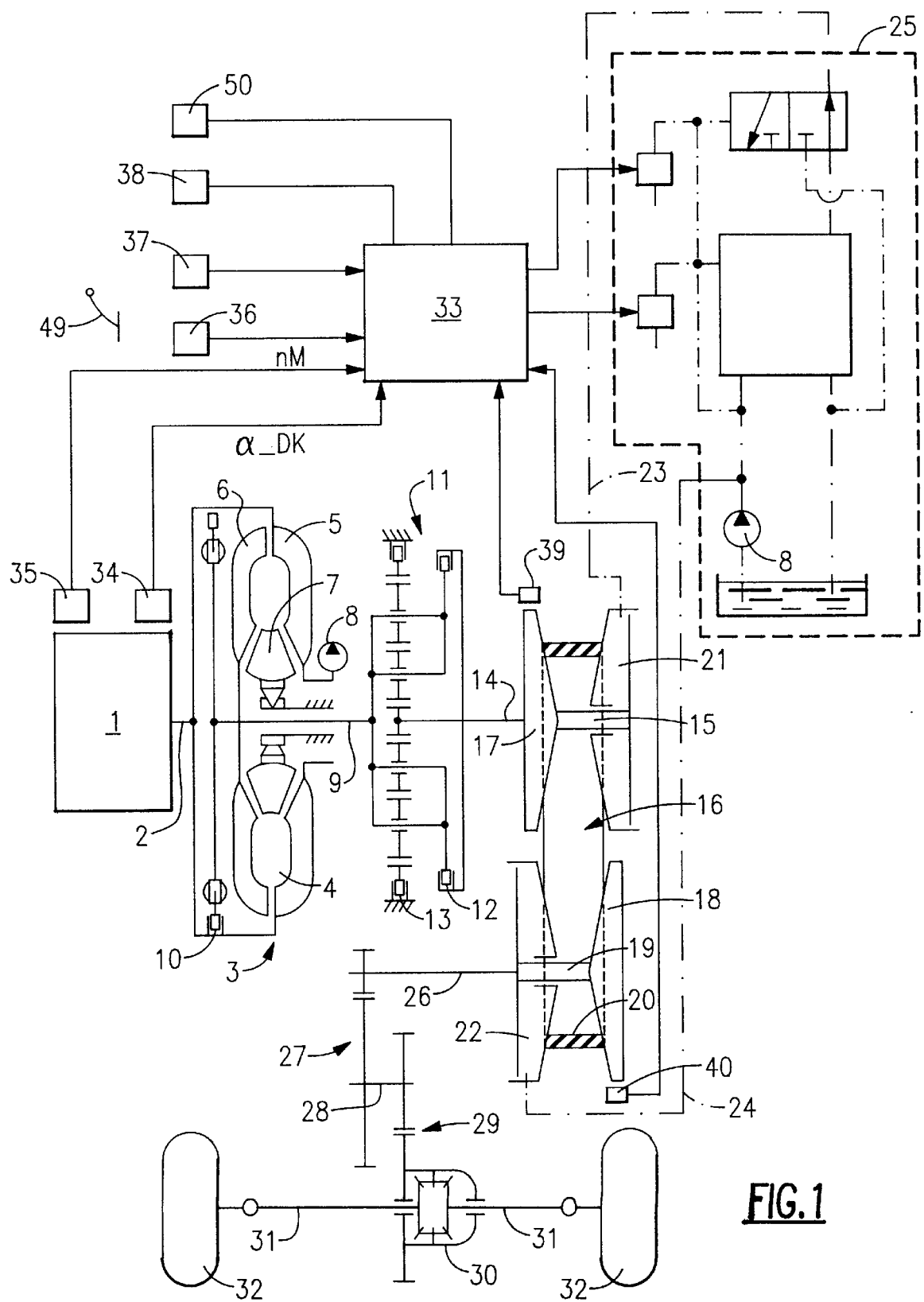
FIG. 1 is a diagram of a continuously variable transmission within a vehicle.

In FIG. 1 essential units for the drive of a vehicle and the diagram of a continuously variable transmission can be seen.

A drive unit 1, preferably an internal combustion engine, actuates a starting unit 3 via an input shaft 2. The starting unit 3 is preferably a hydrodynamic torque converter 4. The latter consists of an impeller, a turbine wheel and a stator 5, 6, 7, respectively. A pump 8 is actuated by the impeller 5.

The turbine wheel 6 is non-rotatably connected with an intermediate shaft 9. A direct operative connection between input shaft 2 and intermediate shaft 9 is created when a converter bridge clutch 10 is engaged. The intermediate shaft 9 is the input shaft of a reversing set 11 by which the forward or reverse travel directions can be switched by switching elements 12 (clutch) and 13 (brake).

One output shaft 14 drives a primary shaft 15 of a variator 16.

The variator 16 consists of a primary disc 17 and a secondary disc 18. The latter is non-rotatably connected with a secondary shaft 19. The primary and secondary discs 17 and 18 are formed by bevel discs disposed in pairs which accommodate a chain drive part 20 between them, preferably a sliding chain.

A primary cylinder 21 and a secondary cylinder 22 are attached to a hydraulic control 25 by hydraulic pipes 23 and 24. The secondary shaft 19 is non-rotatably connected with an output shaft 26 which, via a gearwheel pair 27, drives another intermediate shaft 28. The intermediate shaft 28 is in driving connection, via another gearwheel pair 29, with a differential 30. The driving power is transmitted by the differential 30, via axle half shafts 31, to the driven wheels 32 of the vehicle.

Another essential component of the continuously variable transmission is an electronic transmission control (ESC) 33. In the latter, the performance graphs of the drive unit 1, of the hydrodynamic torque converter 4, including the shift characteristic lines of the converter bridge clutch 10, and at least one driving strategy are deposited. The function of the transmission control is always to adjust the transmission ratio so that the guide parameter engine rotational speed (stationary theoretical rotational speed value nM-theor. of the drive unit 1) follows a preset strategy. The actual engine rotational speed nM control parameter is controlled by a closed control loop. Divergences between the theoretical and the actual deliver input parameters for the hydraulic control 25 (transmission ratio regulator).

One sensor 34 detects the input variable actual throttle valve position designated with α-DK. The actual rotational speed of the engine is detected by a sensor 35. A sensor 36 monitors the position of a control part 49 with which the vehicle driver announces a power need. The position of the throttle valve of the drive unit is changed (E-gas) by said control part. A sensor 37 delivers the input variable of the position of a selection lever which depends on the preselected travel program. The enumeration of the possible input variables is incomplete. The temperature of the hydraulic fluid (ATF), for example, can be one of said parameters. Said temperature is detected by means of a temperature sensor 38. For certain travel situations, additional parameters must be processed. To detect cornering, it is convenient to analyze the transverse acceleration and/or differences in rotational speed of the wheels. This is done with another sensor 50.

The rotational speed of the primary disc 17 is monitored by means of a speed sensor 39. Another sensor 40 delivers the input variable of the rotational speed of the secondary disc 18. The input variables are processed to form output variables having different functions (information to indicate system conditions, control signals for actuators). Some of the output variables are provided as input variable to the hydraulic control 25 in order to release the actuation of electromagnetic valves.

The illustrations that follow should contribute to a better understanding of the dynamic cycles within the control loop (block gearshift diagram of FIG. 2):

The drive unit 1 can be described by a performance graph of the form:

$$M\_1 = f(\alpha\text{-}DK, \omega\_1)$$

Here M__1 means the torque of the drive unit, α-DK= throttle valve position and ω__1 the angular speed of the crankshaft or of the drive shaft 2.

The moment balance on the crankshaft or input shaft 2 (a rigid shaft is assumed) amounts to:

$$\theta\_M\_ \frac{d\omega\_1}{dt} = M\_1 - M\_S1.$$

Here:

ω__1−ω__S1

(S1 means the primary disc 17)

It means that the clutch or converter bridge clutch is engaged.

The transmission characteristic of the continuously variable transmission is expressed as the following transmission function:

$$\frac{d\omega\_S1}{dt} = \frac{d\omega\_1}{dt} = iV\frac{D\omega\_S2}{dt} + \frac{diV}{dt}\omega\_S2$$

(S2 means the secondary disc 18)

The following equation applies to the moment balance on the differential 30:

$$\theta\_KW\frac{d\omega\_S2}{dt,} = M\_S2 - M\_D,$$

wherein $\omega\_S2 = \omega\_AB$.

The meanings here: KW is the input shaft of the differential D; in the instant case this is the intermediate shaft 28, and AB identifies the output shaft which corresponds to the axle half shafts 31 in FIG. 1.

To $\omega\_AB$ applies:

$$\omega\_AB = i\_D \, \omega\_RAD.$$

The meanings here: i_D is the transmission ratio of the differential 30 and $\omega\_RAD$ is the angular speed of the driven wheel 32.

To the vehicle applies the transmission function:

$$m\frac{dvF}{dt} = \frac{M\_AR}{r} - F_w$$

The meanings here: vF is the vehicle speed and W corresponds to the air resistance. vF can also be described with the angular speed $\omega\_RAD$ multiplied by the radius of the driven wheel 32.

The air resistance $F_w$ is calculated according to the equation:

$$F_w = \frac{1}{2}\varrho\_L \cdot A\_Fc\_W \cdot vF^2 + m \cdot g(\sin\gamma + \mu \cdot \cos\gamma) + \frac{M_{brake}}{r}$$

$\mu$ = rolling resistance $\cos\gamma$ = output force

From the above given equations for the output speed (rotational speed of the secondary disc 18), the following differential equation can be given:

$$\frac{d\omega\_S2}{dt} = \frac{1}{\theta\_M\_1iV^2 + C_0}\left(iVM\_1 - C_1\omega\_S2^2 - \theta\_M\omega\_S1\frac{diV}{dt} - \frac{m \cdot g \cdot r}{i_D}(\sin\gamma + \mu \cdot \cos\gamma) - \frac{M_{brake}}{i_D}\right)$$

The meaning here: $\theta\_M \, iV_2 + C_0$ is the sum of the inertia moment referred to the axle (axle half shaft 31), $C_1$ is a vehicle typical parameter with which the driver takes the tractional resistance into account.

Note:

The expression $iV \times \omega\_S2$ has to be replaced by $\omega\_S1$.

There have been discussed above, when explaining the prior art, the disadvantages of a continuously variable transmission in certain driving situations. What is to be understood by the "suspenders effect" and how it makes itself felt by the driver was explained. It was stated why said effect impairs the subjective driveability. These disadvantages can also be discussed with the aid of the above reproduced differential equation. For this purpose, it is only necessary to assumes that the term of the differential equation in parentheses assumes a negative sign. This is the case when the transmission ratio iV is adjusted with a large adjustment gradient in a direction toward a small transmission ratio (low). The same applies when the primary disc 17 is quickly accelerated by a sudden boosting in the engine speed. The result of this is that the secondary disc 18 is braked. Accordingly, the vehicle is not accelerated, during a downshift, but slowed down in a manner the driver feels disadvantageous.

The condition that the secondary disc 18 is accelerated reads:

$$\frac{diV}{dt} < \frac{1}{\theta\_M\_1} \cdot \frac{M\_1}{\omega\_S2} - \frac{C_1}{\theta\_M\_1}\frac{\omega\_S2^2}{\omega\_S1} - \frac{m \cdot g \cdot r(\sin\gamma + \mu \cdot \cos\gamma)}{i_D\theta M\omega S1} - \frac{M_{brake}}{i_D\theta M\omega S1}$$

Since the speed of the vehicle vF is proportional to the rotational speed of the secondary disc 18, as long as this condition is retained, the vehicle is accelerated.

In the limit case it applies that the change in transmission ratio diV/dt must not be greater than the expression appearing to the right side of the above equation which represents the limit and hereinafter will also be designated with "limit". Accordingly this applies:

*diVG/dt=limit*

As long as this condition is retained, the secondary disc 18 is always accelerated during a downshift. If an adjustment takes place along the limit gradient "limit", then the acceleration of the secondary disc 18 or of the vehicle equals zero.

This invention is based on this knowledge. The invention makes use of the consideration that by monitoring the transmission ratio gradient diV/dt and by comparing it with the "limit", it is possible to take steps when the "limit" is exceeded, in the case of too quick an adjustment. The solution here is aimed at keeping a certain distance from the "limit", during controlled adjustment of the transmission ratio, in order to thus ensure a minimum acceleration, but at least no deceleration during a downshift.

In general, it is true that the strategy used is based on the standard of a desired theoretical rotational speed nM-theor. for the engine (drive unit 1) or the primary disc 17. Said theoretical rotational speed is then converted to a standard for the transmission ratio iV of the continuously variable transmission. The transmission ratio is adjusted to its theoretical value. The control loop closes by a renewed comparison with the actual rotational speed of the engine. A control loop, corresponding to this general description, has in a first approximation a transmission characteristic.

Figure 2:
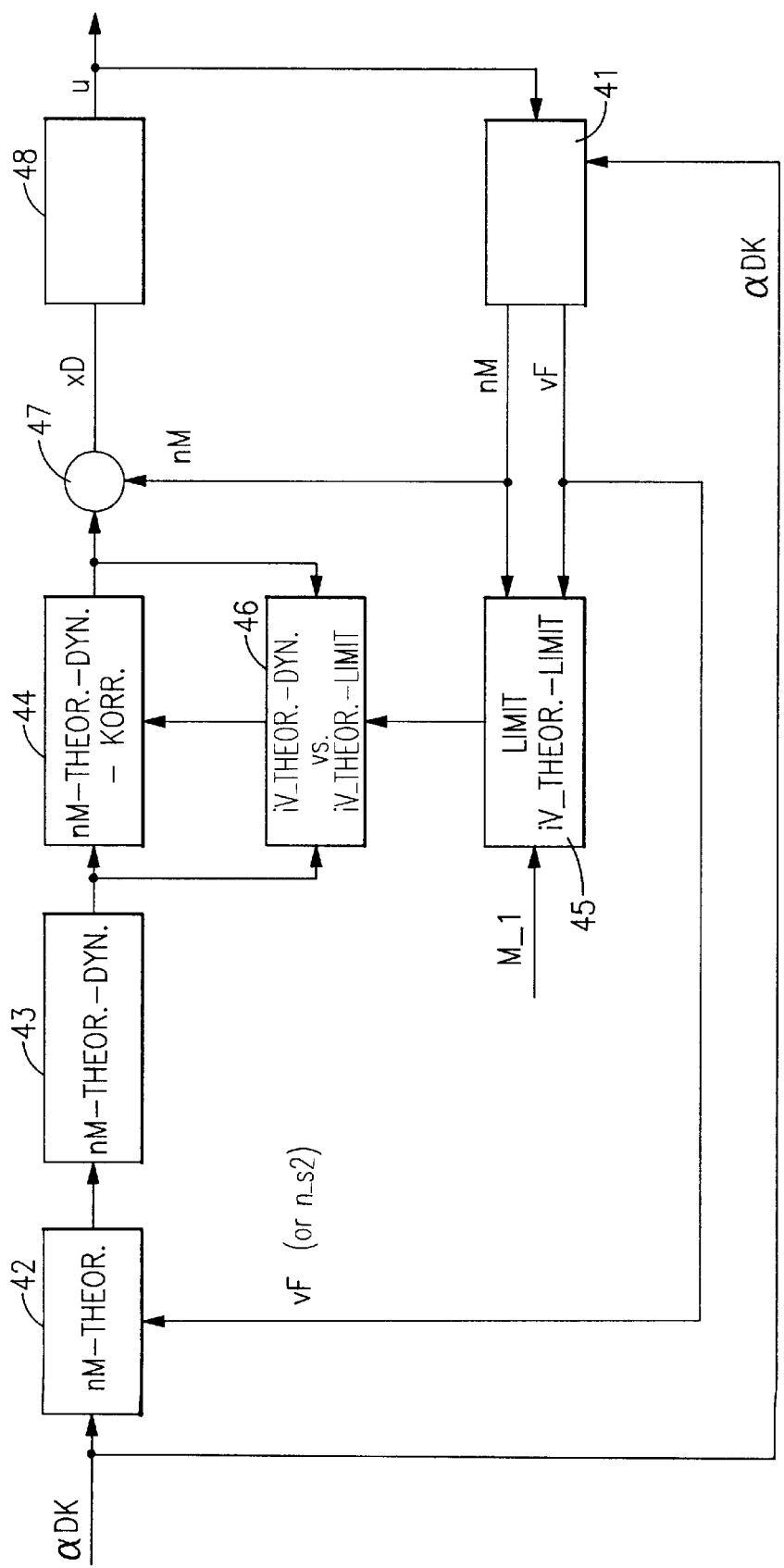
FIG. 2 is a block gearshift pattern of a control loop for control of the transmission ratio of the continuously variable transmission of FIG. 1.

FIG. 2 shows a block gearshift diagram of a device for control of the gear ratio iV of a continuously variable transmission. The vehicle, the drive unit 1 and the continuously variable transmission are summarized by a function block 41 (section).

The function block 42 serves to show a stationary operating point. To the function block 42, an input variable which represents the power requirement that the vehicle driver announces via the control part 49 (sensor 36) is provided. This input variable must correspond to the actual throttle valve position α-DK. To the function block 42, the actual vehicle speed vF or the rotational speed n_S2 of the secondary disc 18 is also provided. The function block 42 serves to calculate a set point value, that is, a stationary theoretical rotational speed value nM-theor. of the drive unit 1. From this, an operational performance graph is deduced which contains a coordination of the position of the control part and of the vehicle speed vF with the theoretical rotational speed nM-theor. Said stationary theoretical rotational speed value nM-theor. is provided at the exit of the function block 42.

This stationary theoretical rotational speed is fed to a set-value filter 43 with which the change of an unsteady theoretical rotational speed nM-theor-dyn is amended during a sudden change of the stationary theoretical speed nM-theor. by directed coordination of a transition function (transmission characteristic, time constant T_S). Here, the possibility of selecting, from several transition functions, the one which best takes into account a specific operating condition (traction operation, sliding operation, kick down, cornering, etc.) exists. At the exit of the set-value filter 43, an unsteady theoretical rotational speed nM-theor.-dyn, varied according to a transition function, is thus provided. This value is fed to a function block 44.

The function block 44 again filters the dynamic theoretical value nM-theor.-dyn. Two possibilities result from said filtration:

In the first possibility, the transition function of the function block 43, that is, the change of the unsteady theoretical rotational speed nM-theor.-dyn with the time constant T_S are kept unchanged or the time constant T_S is replaced by a variable time constant T_RS.

The time constant T_RS is calculated so that the gradient of the unsteady theoretical rotational speed nM-theor.-dyn or the corresponding transmission ratio iV_theor.-dyn conforms to a specific percentage portion of the calculated limiting value "limit"=$diV\_pG/dt$.

The "limit", that is, the transmission ratio gradient of the transmission ratio iV_theor._limit is calculated by a function block 45. To said function block, the input variables are provided which, as explained before, are required for the calculation. The driving speed, the actual engine rotational speed, the rotational speeds of the primary and secondary discs 17, 18, the inertia moment related to the axle and the typical variables of the vehicle serve for this purpose. The function block 45 delivers the adjustment gradient of the transmission ratio iV_theor._limit as an output parameter which is fed to a functional block 46.

In the function block 46, the gradient of the transmission ratio iV_theor.-dyn is compared with the gradient iV_theor._limit. The result of this comparison is a corrective factor with which the time constant of the function block 44 is adapted.

The dynamic theoretical value nM-theor.-dyn is again filtered through the function block 44. At the exit, a corrected dynamic theoretical rotational value nM-theor.-dyn-corr or a corresponding transmission ratio standard is thus provided. This value is fed to a subtraction site 47. At the subtraction site 47, the actual rotational value nM of the prime mover is also provided. The result of the subtraction is a control different xD which is fed to a rotational speed governor 48. The rotational speed a governor 48 can preferably be designed as a governor of variable structure, which structure is changed in accordance with the control difference xD.

The speed governor 48 has a servo function and must adapt the actual rotational speed value nM of the prime mover, in all operating conditions, as quickly and stably as possible to the corrected dynamic theoretical rotational speed value nM-theor.-dyn-corr. The transmission ratio is here changed according to a transition function whose time constant (T_S or T_RS)— as explained—is adapted according to the vehicle specific parameters and the actual driving situation so that the limit of the possible change, which is define by "limit", is not exceeded in any manner. If the transmission ratio in the limit case is changed along the "limit", this means that even if the vehicle is not decelerated, it is not accelerated. Accordingly, the braking action of the engine is fully available when driving downhill. But even in this case, the so-called "suspenders effect" (straight) is at least compensated.

The transition function of the change in the transmission ratio is preferably selected so as to keep a defined distance, such as 50%, from the "limit". In this case, the vehicle is not decelerated during a downshift but accelerated.

The diagrams reproduced in FIGS. 3 to 14 serve to illustrate the relationships.

The diagrams of FIG. 3 to FIG. 12 are based (by way of example) on the following operating point:

| | | |
|---|---|---|
| α_DK | = | 10% |
| iV | = | 0.3793 |
| n_S1 | = | 2 105 rpm |
| n_S2 | = | 5 551 rpm |
| vF | = | 112.25 km/h |
| M_Mot | = | 50.51 Nm |
| M_S1 | = | 50.51 Nm |
| M_S2 | = | 19.16 Nm |
| M_AR | = | 99.61 Nm |

At the moment t=100 ms, the throttle valve is suddenly set to 100%.

The hydraulic time constant is set to zero.

Figure 3:
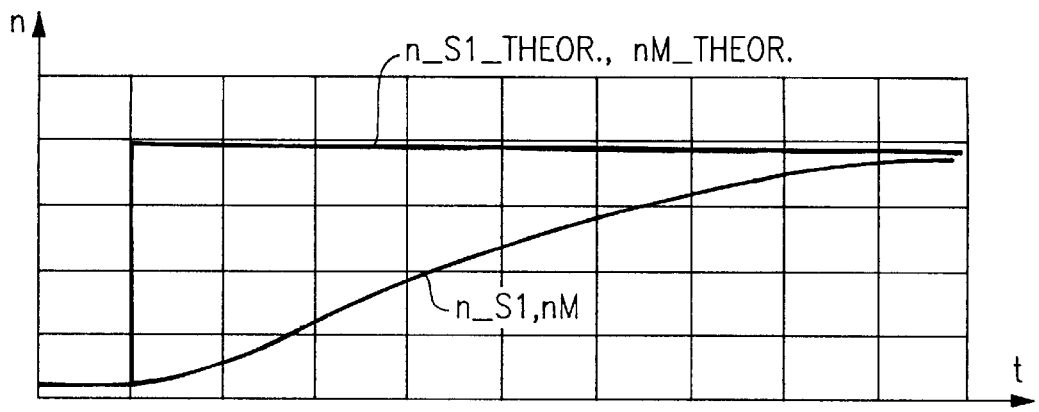
FIGS. 3 to 14 show the different functions for explaining the dynamic characteristics of the control loop of FIG. 2.

The diagram of FIG. 3 shows the change of the rotational speed of the primary disc 17 n_S1 in the case of a sudden boost of the theoretical rotational speed nM-theor. (=n_S1-theor.). The base is a slow adjustment with a time constant T_RS of 200 ms, for example.

Figure 4:
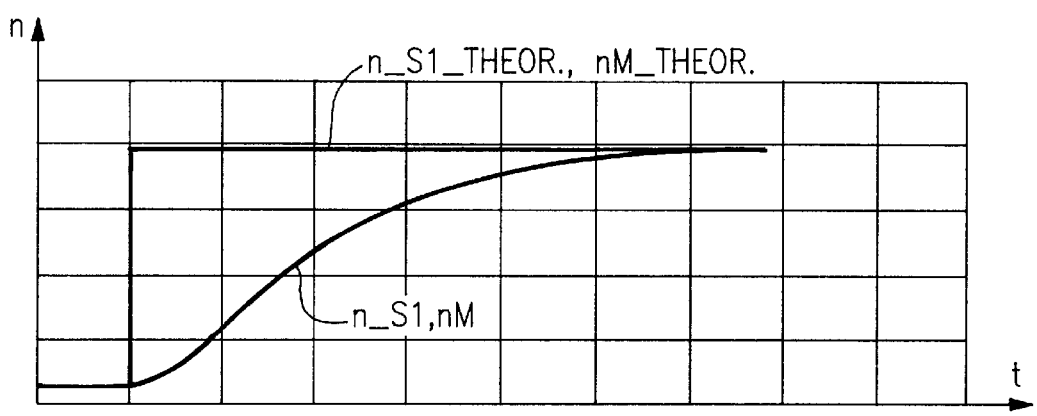

FIG. 4 reproduces the sudden response, at otherwise equal ratios, during a quick adjustment with a time constant T_RS of 100 ms, for example. It is recognized that the rotational speed n_S1 of the primary disc 17 reaches its new theoretical value earlier during a quick downshift than during a slow downshift. The fundamental change corresponds to a $PT_1$-transition characteristic.

Figure 5:
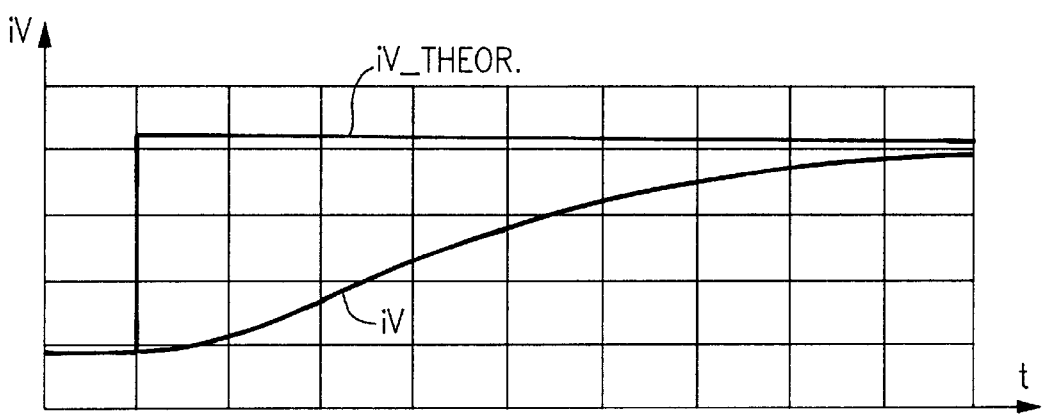
Figure 6:
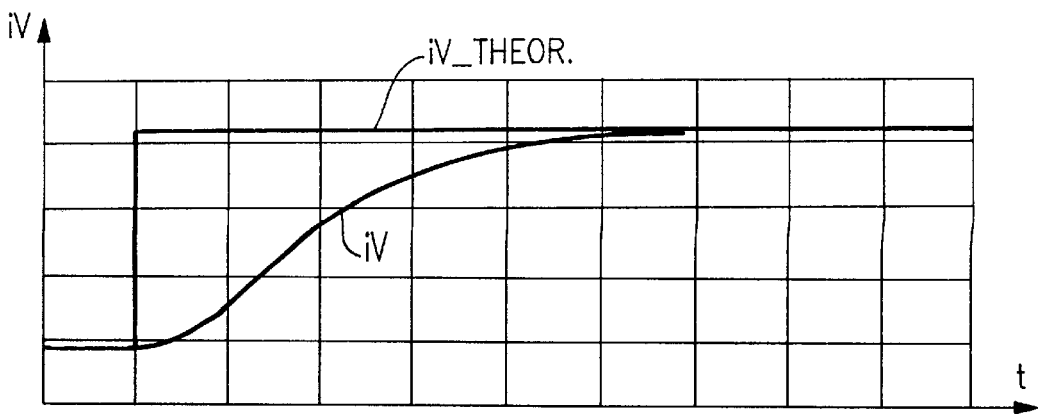

From the diagrams of FIGS. 5 and 6, it follows that the same applies to the change of the theoretical value iV_theor. of the transmission ratio. In the case of a slow adjustment, a correspondingly slower transition to the new transmission ratio iV_theor. appears (FIG. 5). The theoretical value iV_theor. of the transmission ratio is calculated as a function of the theoretical rotational speed nM-theor. (=n_S1_theor.) and the actual rotational speed n_S2 of the secondary disc 18.

Figure 7:
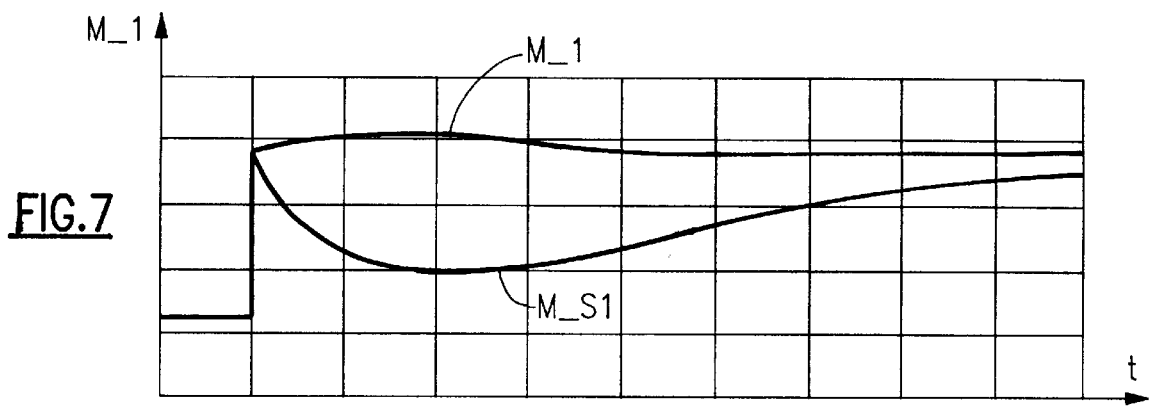

The diagram of FIG. 7 makes clear that the torque on the primary disc 17 M_S1 shows a sudden increase when gas is given. It then drops to a minimum value and finally rises asymptotically toward a corresponding end value.

Figure 8:
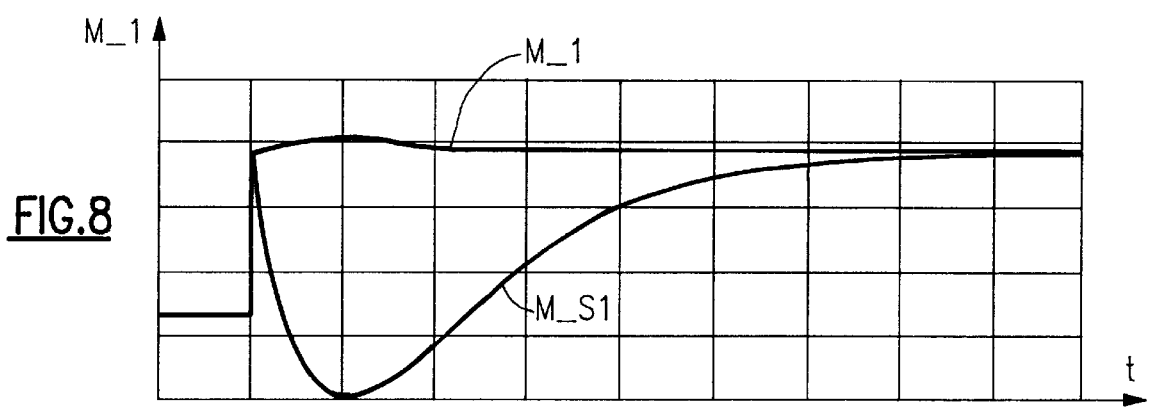

From the diagram of FIG. 8 is to be understood that the minimum value of the torque of the primary disc 17 M_S1, during a quick downshift, is clearly less. The difference between the engine torque M_1 and the torque on the primary disc M_S1 is available for accelerating the primary disc or the engine.

Figure 9:
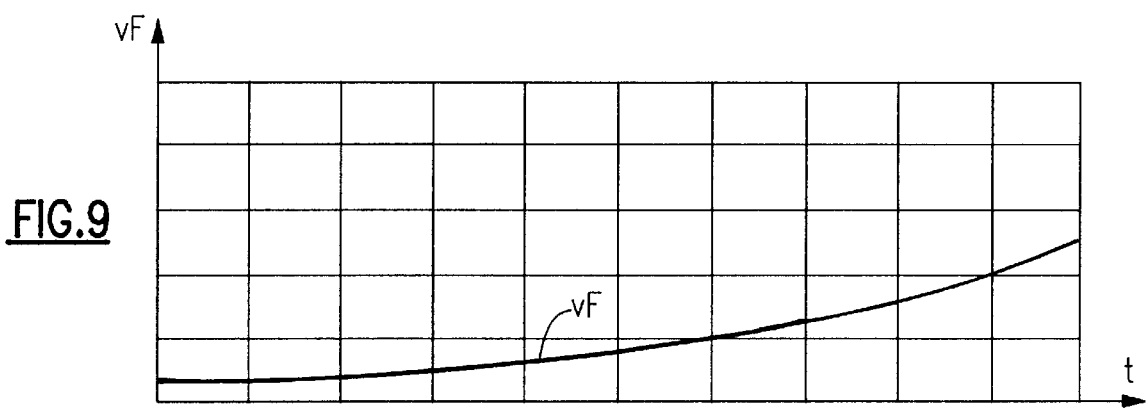
Figure 10:
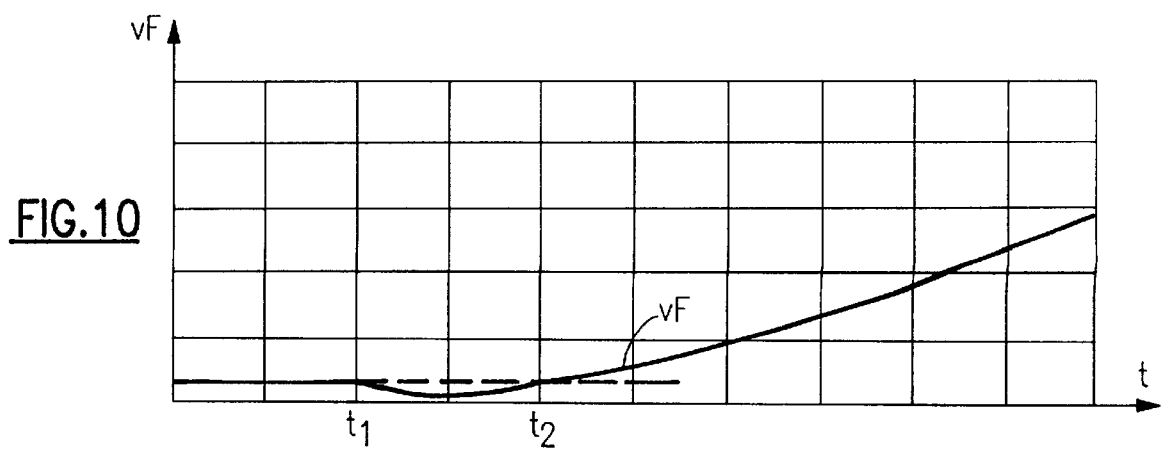

The change in the difference of torque on the secondary disc 18 is not shown, but corresponds in principle to the changes in vehicle speed vF, as emphasized in FIGS. 9 and 10. During a slow adjustment (slow downshift), the vehicle speed increases slowly (FIG. 9). The vehicle accordingly is slowly accelerated.

During a quick adjustment (quick downshift), the difference of torque on the secondary disc 18 shows a transition to a negative so that the secondary disc is briefly braked (suspenders effect). This shows the change in vehicle speed vF, as reproduced in FIG. 10. During a quick downshift, the vehicle speed vF shows a drop below the output value (suspenders effect). Up to the point in time $t_1$ (substantially 400 ms) no acceleration of the vehicle takes place. For a further time interval $t_2-t_1$ the vehicle is decelerated. Starting from the point of time $t_2$, a comparatively high acceleration of the vehicle occurs.

Figure 11:
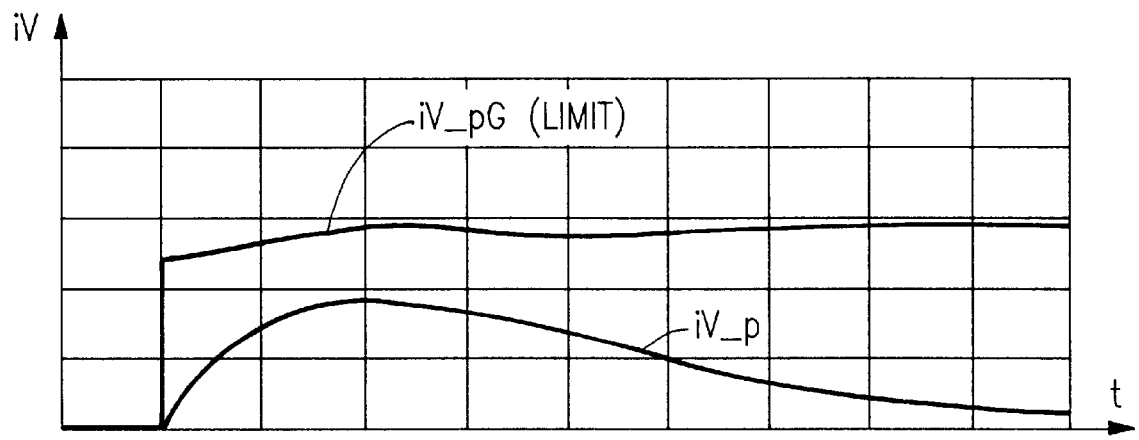
Figure 12:
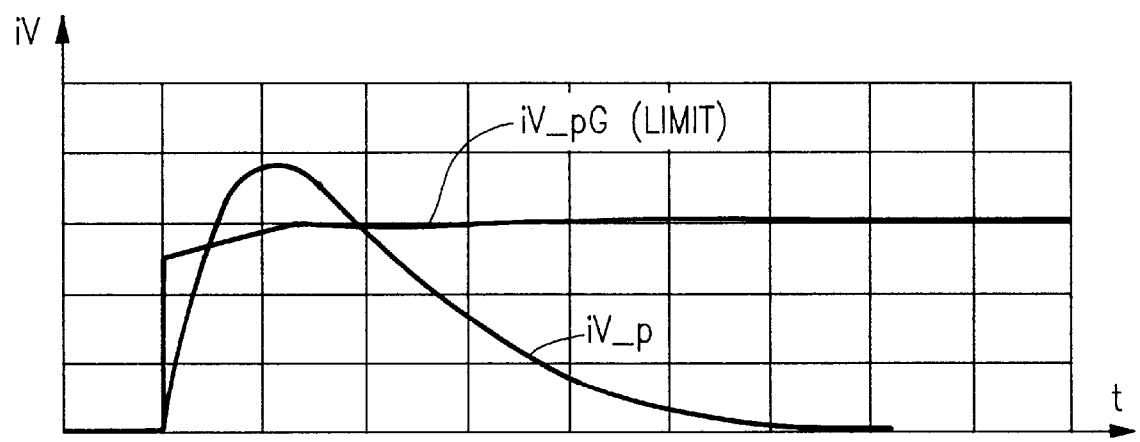

The change of the transmission ratio gradient iV_p and of the "limit" iV_pG is to be understood from FIG. 11 during a slow adjustment (downshift) and FIG. 12 for a quick adjustment (downshift). During a slow adjustment the change of transmission ratio gradient iV_p remains clearly below the limit. Similarly to the reproduction of FIG. 10, FIG. 12, in turn, clearly shows the occurrence of the suspenders effect during a quick adjustment (downshift). The actual gradient of the transmission ratio iV_p is then temporarily ($t_2-t_1$) over the calculated limiting gradient "limit".

Figure 13:
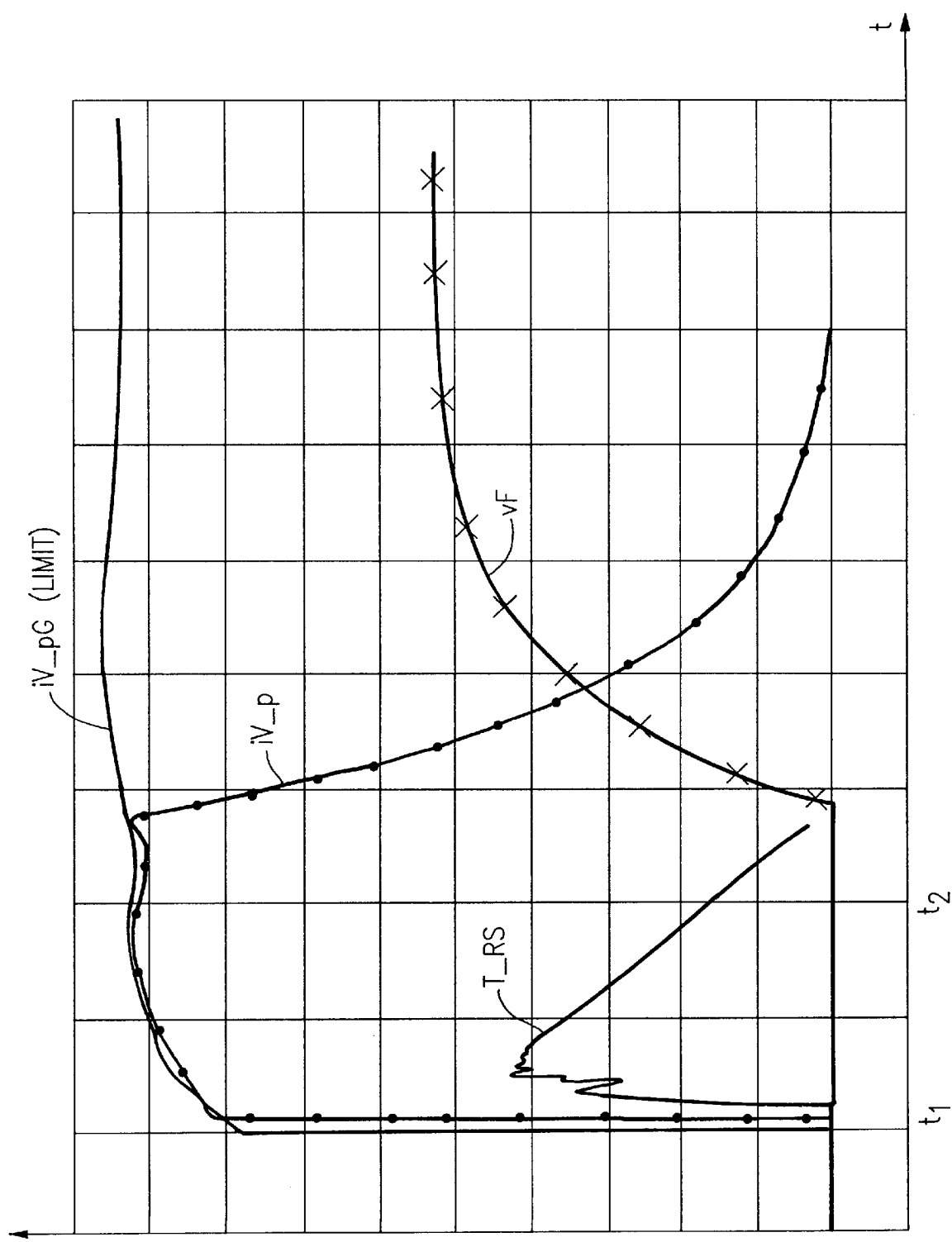
Figure 14:
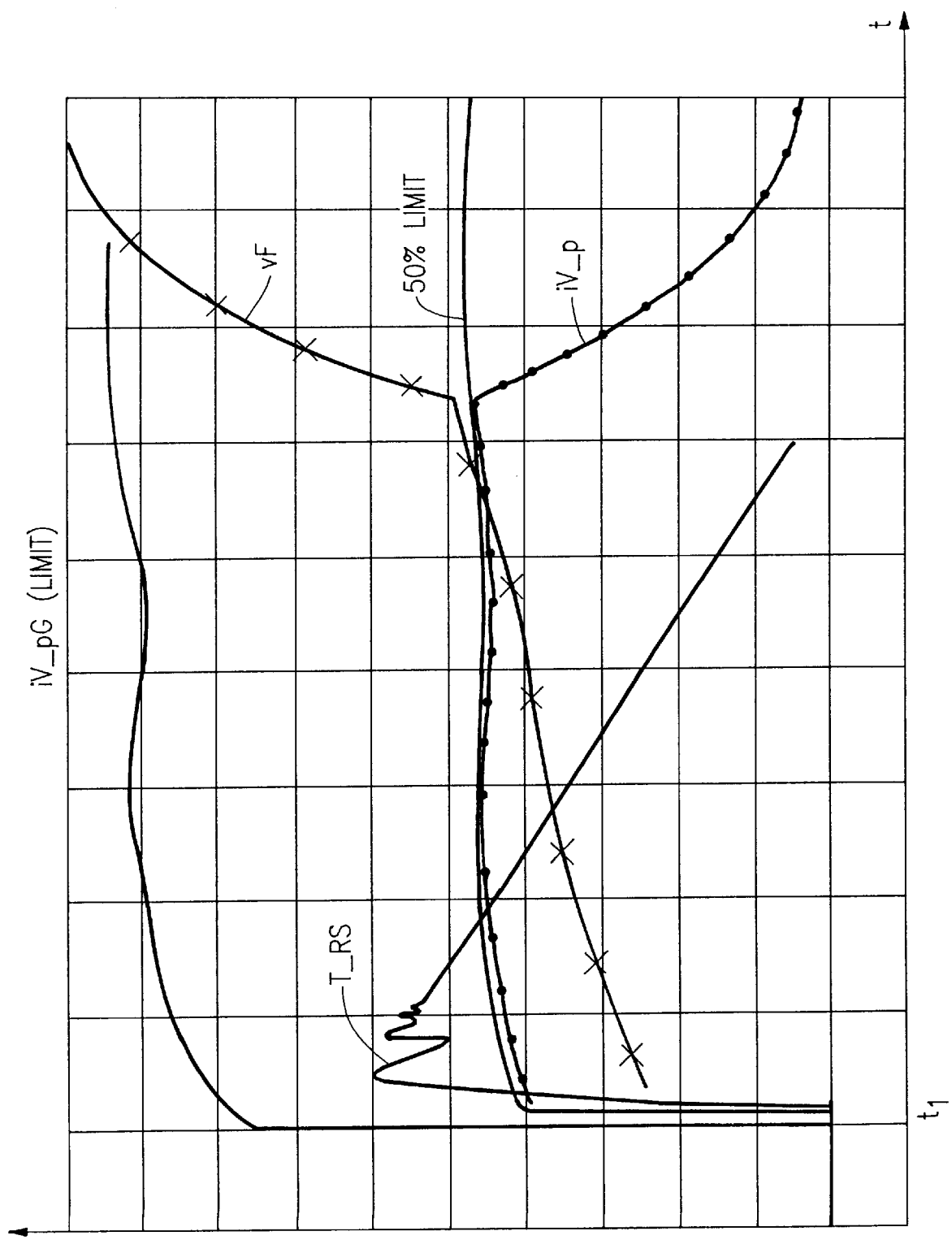

FIGS. 13 and 14 once more evidence the effects of the function blocks 44, 45 and 46:

FIG. 13 is based on the transition functions in which the time constant T_RS is adapted so that the change of the transmission ratio iV_p runs along the "limit" iV_pG. The time constant T_RS amounts to 200 ms. Within a time interval $t_2-t_1$ (110 ms<t<370 ms) the acceleration of the vehicle equals zero.

The advantages of the solution, according to the invention, become clear by a comparison with the transition functions of FIG. 14. The positive transmission ratio iV_p proceeds, for a distance from the transmission ratio iV_pG (limit) or, in other words, along a calculated limit which makes up about 50% of the limit transmission ratio. The adapted time constant T_RS amounts to about 600 ms.

A constant acceleration of the vehicle, starting from the point of time $t_1$, is clearly to be recognized. This also clarifies the change of the vehicle speed vF (marked with crosses). Compared to the diagram of FIG. 13, it is evident that the so-called suspenders effect does not occur.

| | Reference numerals | | |
|---|---|---|---|
| 1 | drive unit | 27 | gearwheel pair |
| 2 | input shaft | 28 | intermediate shaft |
| 3 | starting unit | 29 | gearwheel pair |
| 4 | hydrodynamic torque converter | 30 | differential |
| | | 31 | axle half shafts |
| 5 | impeller | 32 | driven wheels |
| 6 | turbine wheel | 33 | electronic transmission control (EGS) |
| 7 | stator | | |
| 8 | pump | 34 | sensor |
| 9 | intermediate shaft | 35 | sensor |
| 10 | converter bridge clutch | 36 | sensor |
| 11 | reversing set | 37 | sensor |
| 12 | gearshift element | 38 | temperature sensor |
| 13 | gearshift element | 39 | rotational speed sensor |
| 14 | output shaft | 40 | sensor |
| 15 | primary shaft | 41 | function block |
| 16 | variator | 42 | function block |
| 17 | primary disc | 43 | set-value filter |
| 18 | secondary disc | 44 | function block |
| 19 | secondary disc | 45 | function block |

-continued

| | Reference numerals | | |
|---|---|---|---|
| 20 | chain organ | 46 | function block |
| 21 | primary cylinder | 47 | subtraction site |
| 22 | secondary cylinder | 48 | rotational speed governor |
| 23 | hydraulic pipe | | |
| 24 | hydraulic pipe | 49 | control part |
| 25 | hydraulic control | 50 | sensor |
| 26 | output shaft | | |

We claim:

1. A device for control of a gear ratio of a continuously variable transmission in a vehicle having a prime mover and a power control device to which are preset, via a control part (49), theoretical rotational speed values (nM-theor.) which are compared with measured actual rotational speed values (nM) of the prime mover; and having an actuator for changing the gear ratio (iV) of the continuously variable transmission to which is fed setting signals, in proportion to differences in the theoretical and actual rotational speed values;

wherein the theoretical rotational speed value (nM-theor.dyn) is filtered by means of a set-value filter (44), said set-value filter (44) has a time constant (T_RS) which, as a function of a gradient (diV/dt) of the gear ratio (iV), is adapted in a manner such that the gear ratio is changed according to a transition function which defines a limit of a maximum adjustment rate (diV_pG/dt="limit") of the gear ratio such that the vehicle at least is not decelerated.

2. The device according to claim 1, wherein the time constant (T_RS) is calculated so that a gradient of the theoretical rotational speed value (nM-theor., nM-theor.-dyn) or the gradient of the gear ratio (iV) corresponds to a predetermined portion of the limit of the maximum adjustment rate (diV_pG/dt="limit").

3. The device according to claim 2, wherein the gear ratio is changed according to a transition function whose distance from the limit of the maximum adjustment rate (diV_pG/dt) amounts to about 50 percent.

4. The device according to claim 1, wherein a gradient of a limiting gear ratio (iV_theor._limit) is calculated by a function block (45) to which is provided, as an input variable, at least vehicle speed (vF), the actual rotational speed value (nM), rotational speeds (n_S1, n_S2) of primary and secondary discs (17, 18) of the continuously variable transmission, and an inertia moment of an axle (32) of the vehicle.

5. The device according to claim 4, wherein the gradient of the gear ratio (iV_theor. or iV_theor.-dyn) is compared with the gradient of the limiting gear ratio (iV_theor._limit) and, if the gradient of the limiting gear ratio (iV_theor._limit) is exceeded, a corrective factor is determined with which the time constant (T_RS) of the set-value filter (44) is adaptively changed.

6. The device according to claim 1, wherein the theoretical rotational speed value (nM-theor.) provided to the set-value filter (44) is an unsteady theoretical rotational speed value (nM-theor.-dyn) varied according to a transition function.

7. The device according to claim 6, wherein a corrected unsteady theoretical rotational value (nM-theor.-dyn-corr.) is provided at an output of said set-value filter (44).

8. The device according to claim 1, wherein the time constant (T_RS) is adapted, upon a change in the gear ratio (iV), as a consequence of a downshift.

* * * * *